(No Model.) 2 Sheets—Sheet 1.
C. J. ZEITINGER.
ATTACHMENT OF HANDLES TO VESSELS.
No. 493,140. Patented Mar. 7, 1893.
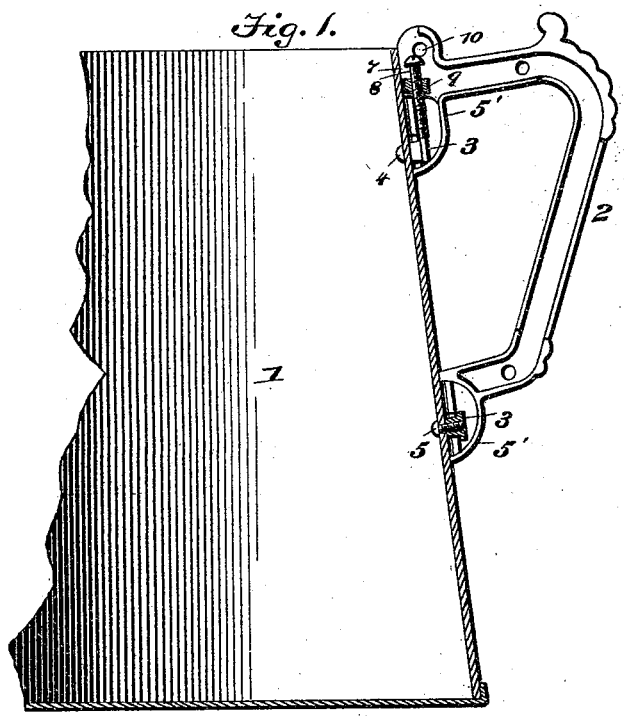
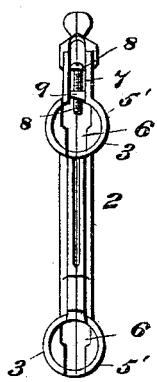
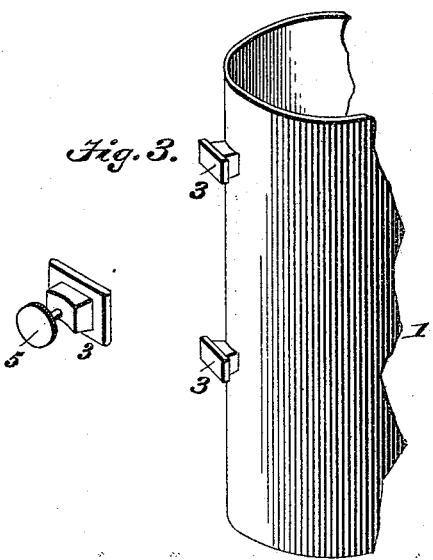
Witnesses:
E. Arthur
W. E. Knight
Inventor:
C. J. Zeitinger
By Knight Bros.
Attorneys (No Model.) 2 Sheets—Sheet 2.
C. J. ZEITINGER.
ATTACHMENT OF HANDLES TO VESSELS.
No. 493,140. Patented Mar. 7, 1893.
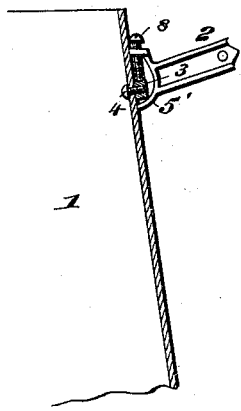
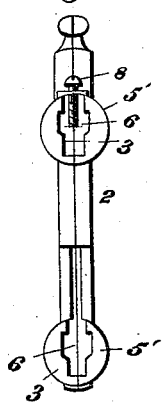
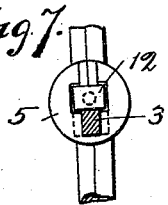
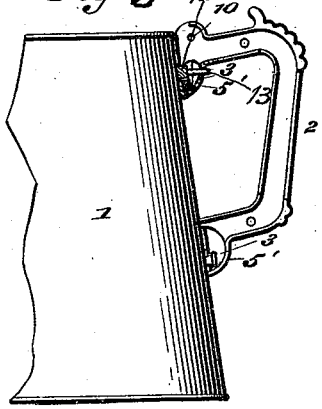
Witnesses:
E. Arthur
W. E. Knight
Inventor:
C. J. Zeitinger.
By, Knight Bros.
Attorney.

UNITED STATES PATENT OFFICE.

CHRISTIAN J. ZEITINGER, OF ZEITONIA, ASSIGNOR TO THE ST. LOUIS STAMPING COMPANY, OF ST. LOUIS, MISSOURI.

ATTACHMENT OF HANDLES TO VESSELS.

SPECIFICATION forming part of Letters Patent No. 493,140, dated March 7, 1893.

Application filed March 12, 1890. Serial No. 343,671. (No model.)

*To all whom it may concern:*

Be it known that I, CHRISTIAN J. ZEITINGER, a citizen of the United States, and a resident of Zeitonia, Wayne county, Missouri, have invented certain new and useful Improvements in the Attachment of Handles to Vessels, of which the following is a specification.

My invention relates to means of attachment used to secure handles to coffee pots and similar articles which are usually enameled or of earthenware and to which therefore, the handles cannot be soldered; and the invention consists in providing one part with a pair of suitable T-heads or lugs, and the other part with a pair of bosses in which are formed suitable locks of T or other shape corresponding to the heads or lugs, and an open channel running upward from one of the boss-sockets for the reception of a suitable locking device.

The invention may be fully understood by reference to the accompanying drawings in which are shown several modifications in the construction of the locking device to be used in connection with the lugs and slots.

In said drawings, Figure 1 is a sectional view showing the preferred form of attachment. Fig. 2 is a front elevation of the handle shown in Fig. 1. Fig. 3 is a perspective view showing the vessel with the T-lugs or heads and also one of said lugs detached. Figs. 4 and 5 are views similar to Figs. 1 and 2 respectively showing a modification. Figs. 6 and 7 are views similar to Figs. 1 and 2 showing a still further modification.

1 represents the body of the vessel, 2 the handle, 3 the T-head or lugs secured to the body by means of rivets, 4, and 5, represents the bosses on the handle in which are formed T-sockets 6.

7, represents the elongated channel extending upward from the upper boss 5, and in it is located the screw 8, which has threaded bearing in a lug 9, formed in said channel.

The T-sockets 6, are both presented the same way and have their largest openings for the reception of the T-heads at top. The channel 7, extends upward from the upper socket and is open all the way up so as to give access to the locking device and permit it to be withdrawn or inserted or adjusted at will.

The handle is formed in two parts cast with the proper projections and outline in the usual manner.

In Figs. 4 and 5 a construction is shown in which the elongated open channel is dispensed with. Here the screw is mounted in the upper wall of the upper boss and is adapted to be projected through far enough to impinge upon the T-head when the same is passed in to the narrow portion of the socket. The operation of this construction when put into use is precisely the same as that shown in Figs. 1 and 2.

10 represents the eye or opening through which is passed the pintle 11, which secures the lid of the vessel in place.

In Figs. 6 and 7 the elongated channel is done away with and the handle and lugs are locked in their engaged position by means of a key 12 having a stem 13 passed through an opening in the rear part of the boss, so that when said stem is pressed in the key engages above the lug and fills the large portion of the T-opening. The under face of the last named key may be slightly beveled for locking the parts more tightly.

In all these forms it is obvious that the principle is substantially the same and I desire it understood that the essential features of my invention are a pair of rigidly connected lugs on one of the parts to be connected, a pair of corresponding socket-bosses on the other part and a suitable locking device for preventing relative movement between the two parts after they are fixed in engaged position to prevent their separation.

Having thus described my invention, what I claim as new therein, and desire to secure by Letters Patent, is—

1. The combination of a body having T-heads secured thereto, with a handle provided with T-slots engaging the T-heads of the receptacle, and a locking device engaging a portion of the handle and one of the T-heads.

2. In a coffee-pot or other vessel the means of attaching the handle to the body which consists in a pair of rigidly connected hollow bosses carried by the handle and provided with T-slots presented in the same direction, a pair of corresponding T-heads rigidly secured to the vessel and a locking device engaging the T-heads and part of the handle for preventing relative movement between the handle and body when the heads are engaged in the slots.

3. The herein described means for securing handles to vessels the same consisting of a pair of T-heads located upon the vessel, socket bosses having T-slots located upon the handle and a removable key or locking device engaging the handle and one of the T-heads, substantially as set forth.

4. The combination of a body carrying suitable T-heads, a handle having socket bosses and a channel communicating with one socket, and a locking device located in one socket, bearing on one of the heads and engaging the handle, substantially as described.

5. A handle for coffee-pots or similar articles formed with hollow bosses provided each with a T-slot, one of said bosses having a channeled lug, the channel in said lug being in continuation of the slot in said boss, substantially as and for the purpose described.

6. The combination of the body having the T-heads the handle having the corresponding sockets and the channel, and the screw secured to the handle located in said channel and adapted to impinge on the T-head as and for the purpose set forth.

CHRISTIAN J. ZEITINGER.

Witnesses:
HERVEY S. KNIGHT,
F. A. HOPKINS.